May 17, 1966  K. K. KESLING  3,251,914
MAKING POCKETED BELT

Filed Sept. 28, 1962  2 Sheets-Sheet 1

INVENTOR.
Keith K. Kesling
BY
Carl A. Stickel
His Attorney

May 17, 1966  K. K. KESLING  3,251,914
MAKING POCKETED BELT
Filed Sept. 28, 1962  2 Sheets-Sheet 2

INVENTOR.
Keith K. Kesling
BY
His Attorney

United States Patent Office 3,251,914
Patented May 17, 1966

3,251,914
MAKING POCKETED BELT
Keith K. Kesling, Dayton, Ohio, assignor to General Motors Corporation, Detroit, Mich., a corporation of Delaware
Filed Sept. 28, 1962, Ser. No. 226,809
2 Claims. (Cl. 264—94)

This invention is directed to a method of making belts for freezing ice cubes or for conveying other liquid or solid materials.

Recently, belts for ice cube making apparatus have been formed from a single strip having a series of pockets formed therein, after which the ends of the strip are joined by a lap joint to make the belt endless. The joints are objectionable since they provide a section which is less flexible than the remainder of the belt and which is therefore more highly stressed when passing over the pulleys and which, also is therefore more liable to separation and breakage.

It is an object of this invention to provide a simple, inexpensive, reliable method for making an endless belt without joints or seams containing a series of pockets.

It is another object of this invention to provide a simple, inexpensive, reliable method for forming pockets in a circular arrangement in plastic tubing and then cutting the tubing into a plurality of belts.

Generically, I heat thermoplastic tubing to a deformable plastic state and then create a greater pressure within the tubing than its exterior to force the tubing into the pockets of an enveloping mold. The tubing may be cut into a series of endless belts upon a mandrel, after which the belts may be turned inside out to make the pockets face outwardly.

Further objects and advantages of the present invention will be apparent from the following description, reference being had to the accompanying drawings wherein preferred embodiments of the present invention are clearly shown.

Figure 1:
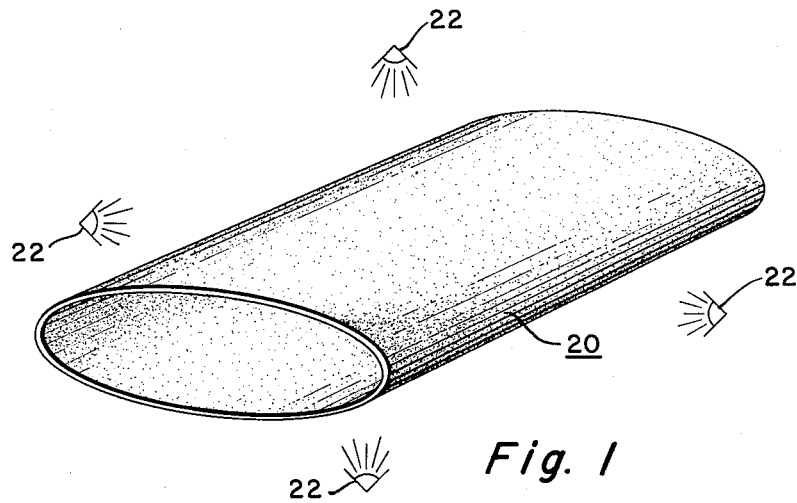
FIGURE 1 is a perspective view of a peice of thermoplastic tubing being heated by infrared heat.

Referring now more particularly to the drawings, there is shown in FIGURE 1 a piece of extruded thermoplastic tubing 20 which may be extruded polyethylene or polypropylene or vinyl or vinyl veniladene copolymers or other suitable plastic material. The tubing is of a suitable thickness, such as $3/32$ or $1/8$ of an inch thick. This tubing is then heated to the plastic deformable state by a suitable number of infrared heaters 22, such as four heaters located on the top, bottom and sides of the tubing 20. The tubing 20 may be moved relative to the heaters or the heaters may be moved relative to the tubing so as to evenly distribute the heating effect to the tubing to achieve a uniform deformable plastic state.

The tubing 20 is then placed in a mold 24 while it remains in the plastic deformable state. This mold 24 is preferably cylindrical in shape and is provided with end caps or enclosures 26 and 28 provided with circular sealing gaskets 30 between it and the end of the cylindrical mold 24 for sealing the ends of the mold 24. The enclosures 26 and 28 are fastened in place by suitable wing nuts 32 threaded on pivoted studs pivotally connected to the mold 24 and extending through radial slots in the peripheries of the end caps 26 and 28. The mold 24 is provided on its interior surface with six series of spaced pockets arranged in a circle and designated 34 to 44 inclusive. These pockets are uniformly spaced both radially and axially so as to provide for a uniform product. Each of the pockets is provided with a vent, all of which are designated by the reference character 46. These vents extend from the bottom of the pocket to the exterior of the mold 24.

After the tubing 20 has been placed in the mold 24 and the end caps 26 and 28 fastened in place, and while it remains in the plastic deformable state, air pressure is supplied through aperture 48 in the end cap 28 from the pump 50 which supplies air to the interior of the mold 24 and to the interior of the tubing 20 at a pressure of about ten pounds per square inch to press the adjacent portions of the tubing into the six series of pockets designated 34 to 44 inclusive. The application of this pressure may be controlled by a manual valve 52. This is done while a separate manual outlet valve 54, provided in connection with the end cap 28, remains in the closed position.

Figure 4:
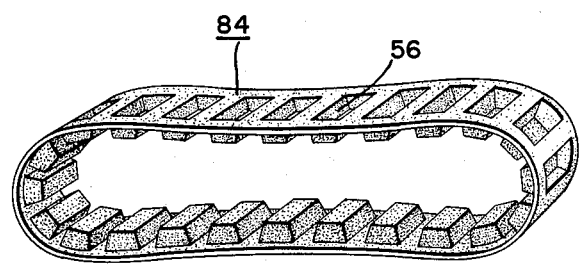
FIGURE 4 is a perspective view showing one of the belts after it has been turned inside out.

After the tubing 20 is forced into the pockets by the greater pressure within the tube 20 than is on the exterior of the tube 20 and the mold 24 and sets in this shape, the valve 54 is opened to relieve the pressure within the mold 24 and one of the end caps 26 or 28 is removed by loosening the wing nuts 32, and the tubing 20 so formed is removed. The tubing 20 with the series of pockets 56 to 66, inclusive, formed therein is placed on a mandrel 68 and rotated. While the mandrel 68 is rotated with the tubing 20 thereon, a cutting tool 70 is applied to the tubing 20 at the midpoint between each series of pockets, as indicated by the lines 72 to 82, to provide six belts each with a single series of uniformly spaced pockets properly trimmed to size. After the tubing 20 has been severed and trimmed into individual belts, each of the belts is turned inside out to provide a belt having outwardly opening pockets, as shown in FIGURE 4, in which a belt 84 is illustrated with outwardly opening pockets 56.

Figure 2:
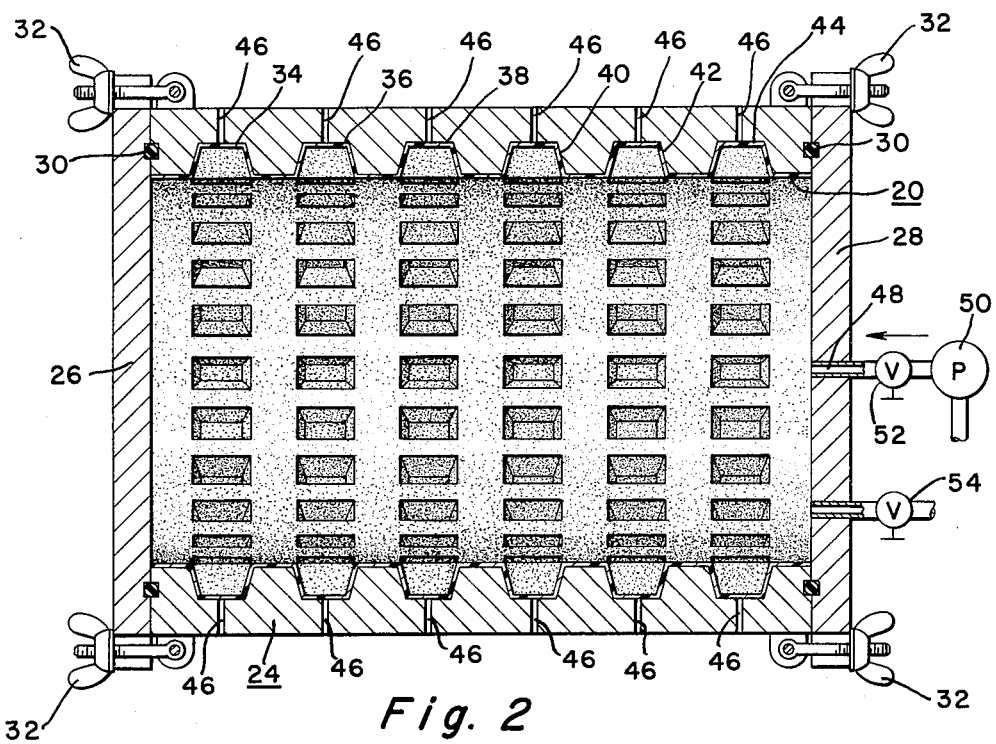
FIGURE 2 is a sectional view through a mold containing the plastic tubing after the pockets have been formed therein.
Figure 5:
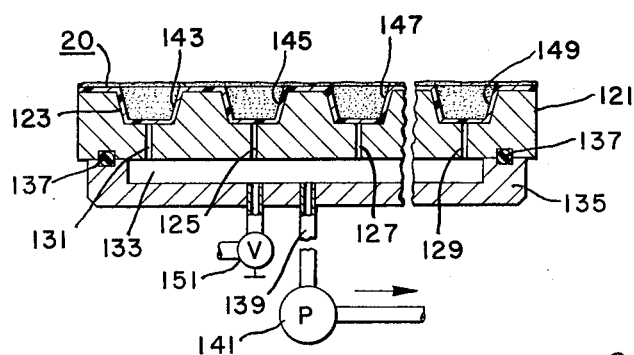
FIGURE 5 is a fragmentary sectional view showing the shaping of the tubing in another form of mold.

In FIGURE 5, there is shown an alternative method in which the tubing 20, having previously been heated by the infrared lamps 22 to the deformable plastic state, is placed within a cylindrical mold 121 containing series of pockets 123 and 129 inclusive, each arranged in a circle similarly to the mold illustrated in FIGURE 2. Each of the pockets is provided with a small passage 131 extending to the outer portion of the cylindrical mold where there is located a cylindrical vacuum chamber 133 which is enclosed by a surrounding cylindrical jacket 135 which is sealed to the cylinder 121 by suitable gaskets 137.

Figure 3:
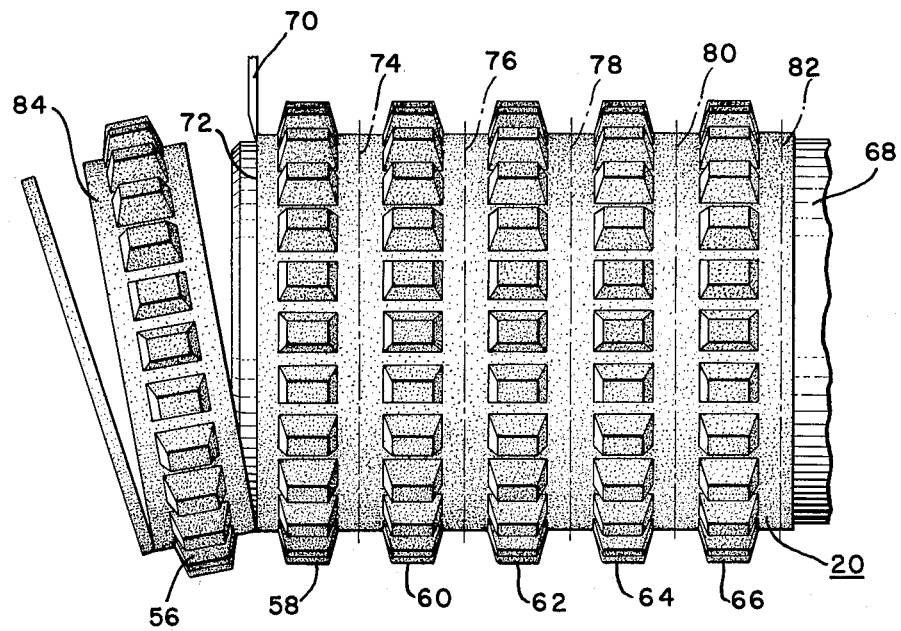
FIGURE 3 is a view showing the formed tubing upon a mandrel with one of the belts having been cut off the tubing.

Connected to the vacuum chamber by the tubing 139 is a vacuum pump 141 which will create a vacuum in the chamber 133 and in the bottoms of the pockets 123 to 129 to form the pockets 143 to 149 in the tubing 20 corresponding to the shapes of the pockets 123 to 129 by creating an excess of pressure on the inner face of the tubing. After this is accomplished, the valve 151 is opened to the vacuum space 133. The tubing 20 with the pockets 143 to 149 formed therein is then removed from the cylinder 121 and placed on the mandrel 68 which rotates as the cutting tool cuts the tubing 20 in-between the pockets 143 and 149 as previously described in connection with FIGURE 3. The severed belts are then turned inside out to form the same type of belt as shown in FIGURE 4. The belt formed by either process is without a joint. Therefore, a durable, simple, economical belt is provided which can be readily manufactured by either process.

What is claimed is as follows:

1. The method of making a pocketed belt which includes heating a tubular piece of thermoplastic material until it reaches a deformable plastic state, moving the tubular piece of thermo-plastic material into the interior of a tubular mold having a plurality of individual recesses arranged in an endless procession on the inner surface of the mold, and while it remains in the deformable plastic state creating a greater pressure in the interior of the tubular piece than the exterior thereof to force the tubular piece outwardly into said recesses in said mold, withdrawing the pressure from the tubular piece, and withdrawing the tubular piece from the mold and thereafter turning the tubular piece inside out.

2. The method of making a pocketed belt which includes heating a tubular piece of thermoplastic material until it reaches a deformable plastic state, moving the tubular piece of thermo-plastic material into the interior of a tubular mold having a plurality of individual recesses arranged in a plurality of endless processions on the inner surface of said mold, and while it remains in the deformable plastic state creating a greater pressure in the interior of the tubular piece than in the exterior thereof to force the tubular piece outwardly into said recesses in said mold, withdrawing the tubular piece from the mold, severing the tubular piece between selected series of recesses formed by said endless processions and thereafter turning inside out each of the severed pieces.

References Cited by the Examiner

UNITED STATES PATENTS

| | | | |
|---|---|---|---|
| 439,451 | 10/1890 | Ward | 18—56 |
| 1,324,850 | 12/1919 | Roberts. | |
| 1,978,481 | 10/1934 | Twiss et al. | 264—224 |
| 1,983,667 | 12/1934 | Hollier | 264—224 |
| 2,139,541 | 12/1938 | Farnsworth | 264—295 |
| 2,359,948 | 10/1944 | Tillotson | 264—224 |
| 2,616,129 | 11/1952 | Burton et al. | 264—100 XR |
| 2,991,500 | 7/1961 | Hagen | 18—56 |
| 3,022,614 | 2/1962 | Dreyfus et al. | 53—30 |
| 3,076,228 | 2/1963 | Johnson | 18—56 XR |

ROBERT F. WHITE, *Primary Examiner.*

ALEXANDER H. BRODMERKEL, *Examiner.*

M. R. DOWLING, *Assistant Examiner.*